Oct. 27, 1942.    T. P. CHASE    2,299,796
BRAKE COOLING DEVICE
Filed Oct. 28, 1939

Inventor
Theron P. Chase
By Blackmore, Lemons & Flint
Attorneys

Patented Oct. 27, 1942

2,299,796

UNITED STATES PATENT OFFICE 2,299,796

BRAKE COOLING DEVICE

Theron P. Chase, Detroit, Mich., assignor to General Motors Corporation, Detroit, Mich., a corporation of Delaware Application October 28, 1939, Serial No. 301,710

3 Claims. (Cl. 301—6)

This invention relates to brakes and particularly to brakes associated with vehicle wheels.

The object of the invention is to provide cooling means to carry away the heat resulting from the friction between the fixed and the rotating members of the brake.

Other objects will be understood from the description which follows:

The invention is illustrated on the accompanying drawing in which.

Figure 1:
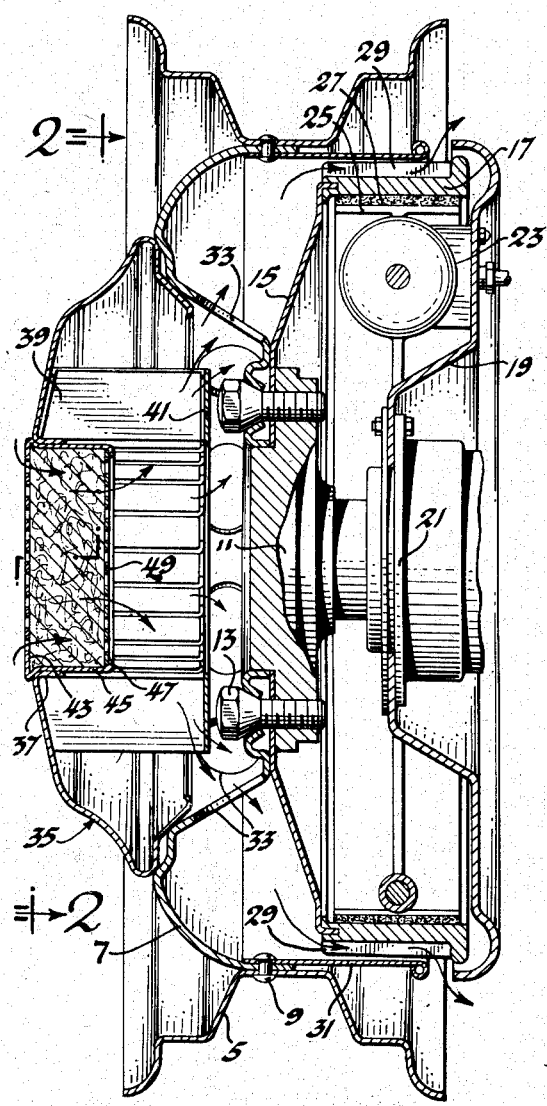
Figure 1 is a transverse section through a wheel provided with the novel cooling means.
Figure 2:
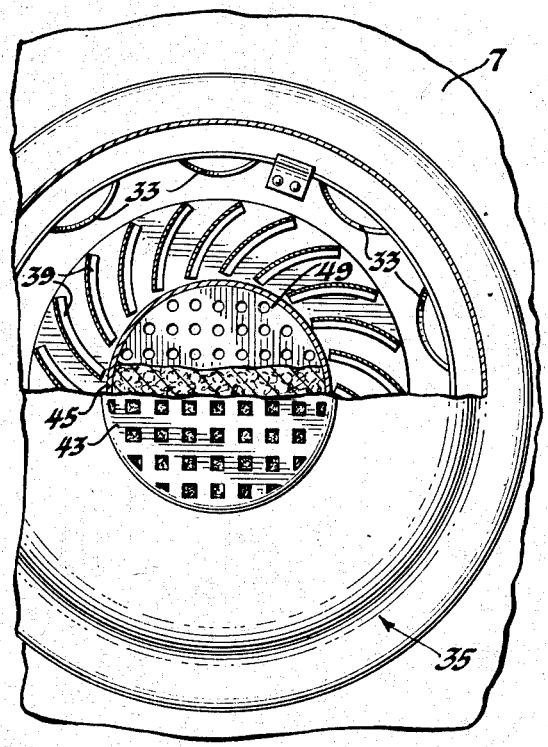
Figure 2 is a view in elevation, partly in section as seen from line 2—2 of Figure 1.

Referring to the drawing, numeral 5 is used to designate a wheel rim. It is secured to a suitably shaped wheel disk 7 by fastening means 9. Disk 7 is secured to the hub 11 by a fastening means 13. These fastening means, bolts 13, also serve to secure to the hub the brake attaching plate 15 to which is attached the annular friction ring 17. A cover plate 19 secured to the non-rotating axle 21 is also illustrated. Numeral 23 is used to identify a conventional wheel cylinder of a hydraulic brake applying system which is used for effecting the frictional engagement with the drum of brake shoes, one of which is marked 25. The shoes are provided with friction facings 27 as usual. As is frequently the case the annular drum is formed with radial ribs 29 to facilitate cooling.

In accordance with this invention the cooling ribs not only provide additional area for exposure to the air but the spaces between the ribs serve as channels for the flow of air. To confine the flow to these channels a cylindrical ring 31 is secured to the wheel disk by the fastening means 9 and the ring 31 overlies the ribs as shown. Openings 33 are formed in the wheel disk for the passage of air from a source to be described to the channels between the ribs of the drum.

The wheel is provided with a relatively large hub cap 35 which is removably secured to the disk in any convenient way. The present invention makes use of this hub cap as an inlet for the current of air which is to cool the drum. The hub cap has a comparatively large central opening around the margin of which the metal is inturned as at 37. To this inturned flange are secured a plurality of vanes 39 secured at their axially inner ends to a tie plate 41. Mounted in the opening of the hub cap is a box-like structure having an apertured circular base 43 and an annular wall 45 extending part way across the region of the vanes and terminating in an inturned end 47. Against the end 47 is placed an apertured disk 49. The space between the base 43 and the disk 49 is filled with some medium suitable to remove dust and foreign matter from the air passing therethrough. When the wheel is rotating the vanes 39 draw air through the filter box and force it through the openings 33 in the wheel disk and out through the channels between the ribs of the brake drum.

Figure 3:
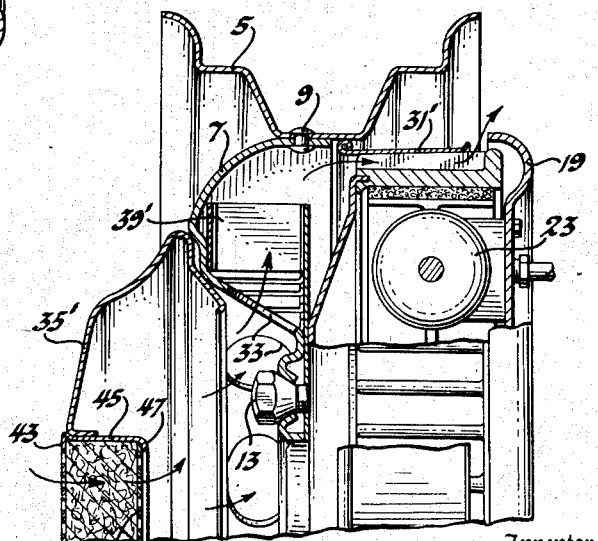
Figure 3 is a section like that of Figure 1 but showing a slight modification.

In the modified form shown by Figure 3 the vanes 39' are secured to the wheel disk 7 instead of to the hub cap 35'. In this case the same filter box is used. As in the case already described, rotation of the wheel produces a flow of air from outside the wheel through the central opening of the hub cap through the disk opening 33 and out through the channels between the ribs of the brake drum. In this form of the invention there is shown an equivalent of plate 31 of Figure 1. It takes the form of a plate 31' which is press-fitted over the ribs instead of being fastened to the wheel by the rivets 9.

I claim:

1. In combination, a wheel, brake means including a drum secured thereto, said wheel having as a part thereof a hub cap with an opening therethrough, said drum having a plurality of external radial ribs, an annular member surrounding said ribs, air current creating means acting in response to wheel rotation and including a series of vanes carried by said wheel to draw air through said hub cap opening and discharge it over said drum.

2. In combination, a wheel, brake means including a drum secured thereto, said wheel having as a part thereof a hub cap with an opening therethrough, said drum having a plurality of external radial ribs, air current creating means acting in response to wheel rotation and including a series of vanes carried by said wheel to draw air through said hub cap opening and discharge it over said drum and between said ribs.

3. In combination, a wheel, brake means including a drum secured thereto, said wheel having as a part thereof a hub cap with an opening therethrough, said drum having a plurality of external radial ribs, an annular member surrounding said ribs and forming with said ribs closed axially extending tubular passages; air current creating means acting in response to wheel rotation and including a series of vanes carried by said wheel to draw air through said hub cap opening and discharge it through said passages.

THERON P. CHASE.